United States Patent
Akula et al.

(10) Patent No.: US 10,149,276 B2
(45) Date of Patent: Dec. 4, 2018

(54) AERIAL ROBOTIC VEHICLE ANTENNA SWITCHING

(71) Applicant: QUALCOMM Incorporated, San Diego, CA (US)

(72) Inventors: Prashanth Akula, Lake Bluff, IL (US); Edward Harrison Teague, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/686,482

(22) Filed: Aug. 25, 2017

(65) Prior Publication Data

US 2018/0288731 A1   Oct. 4, 2018

Related U.S. Application Data

(60) Provisional application No. 62/481,263, filed on Apr. 4, 2017.

(51) Int. Cl.
*H04W 64/00* (2009.01)
*H04B 7/185* (2006.01)
(Continued)

(52) U.S. Cl.
CPC ............ *H04W 64/006* (2013.01); *H01Q 3/24* (2013.01); *H04B 7/18506* (2013.01); *H01Q 1/28* (2013.01); *H04W 84/005* (2013.01)

(58) Field of Classification Search
CPC ..... G05D 1/104; G01S 17/023; G01S 7/4812; H04B 7/185; H04B 7/18506; H04W 4/023; H04W 84/06; H04W 16/28; H04W 64/00

See application file for complete search history.

(56) References Cited

U.S. PATENT DOCUMENTS

| 2009/0295635 | A1 | 12/2009 | Smoot et al. |
| 2010/0198514 | A1* | 8/2010 | Miralles ............... F41G 7/008 701/302 |

(Continued)

FOREIGN PATENT DOCUMENTS

| GB | 2541241 A | 2/2017 |
| RU | 2197065 C2 | 1/2003 |
| WO | 2016106622 A1 | 7/2016 |

OTHER PUBLICATIONS

International Search Report and Written Opinion—PCT/US2018/015015—ISA/EPO—dated May 7, 2018.

(Continued)

*Primary Examiner* — Nizar N Sivji
(74) *Attorney, Agent, or Firm* — The Marbury Law Group, PLLC

(57) ABSTRACT

Various embodiments include methods for managing antennas on an aerial robotic vehicle used for wireless communications. A processor may receive position information identifying a location of the aerial robotic vehicle, determine whether to switch from using a first antenna to using a second antenna for active communications of the aerial robotic vehicle based on the position information, and switch active communications from using the first antenna to using the second antenna in response to determining that active communications of the aerial robotic vehicle should switch from using the first antenna to using the second antenna. The processor may make the determination using information from a database, which may correlate aerial robotic vehicle position to whether to use a particular one of the first and second antennas for active communications. The determination may also be based on a comparison of signal qualities obtained by both antennas.

24 Claims, 6 Drawing Sheets

(51) Int. Cl.
*H01Q 3/24* (2006.01)
*H01Q 1/28* (2006.01)
*H04W 84/00* (2009.01)

(56) References Cited

U.S. PATENT DOCUMENTS

| | | |
|---|---|---|
| 2012/0231788 A1 | 9/2012 | Kaminski et al. |
| 2014/0105054 A1* | 4/2014 | Sægrov ............... H01Q 3/2605 370/252 |
| 2015/0236779 A1* | 8/2015 | Jalali ................. H04B 7/18508 342/367 |
| 2016/0105233 A1* | 4/2016 | Jalali ................. H04B 7/18504 342/359 |
| 2017/0116814 A1* | 4/2017 | Storch ................ G07F 17/0057 |
| 2017/0300717 A1 | 10/2017 | Hu et al. |
| 2018/0034534 A1* | 2/2018 | Jalali ..................... B64C 39/024 |
| 2018/0054251 A1* | 2/2018 | Alex .................. H04B 7/18506 |
| 2018/0061237 A1* | 3/2018 | Erickson ................ G08G 1/163 |

OTHER PUBLICATIONS

Unknown: "Aircraft-Electric-FPV FPV Talk Alert There has to be at least 2 VTX antennas. *READ NOW IMPORTANT*", May 7, 2016 (May 7, 2016), XP055467699, 12 Pages, Retrieved from the Internet: URL:https://www.rcgroups.com/forums/showthread.php?2659385-There-has-to-be-at-least-2-VTX-antennas-%2AREAD-NOW-IMPORTANT%2A [retrieved on Apr. 17, 2018].

\* cited by examiner

AERIAL ROBOTIC VEHICLE ANTENNA SWITCHING

RELATED APPLICATIONS

This application claims the benefit of priority to U.S. Provisional Patent Application 62/481,263 entitled "Drone Antenna Switching," filed Apr. 4, 2017, the entire contents of which are hereby incorporated by reference for all purposes.

BACKGROUND

Aerial robotic vehicles, also referred to as, "unmanned aerial vehicles," "UAVs," or "drones," are generally equipped with an antenna for wireless communicates with a base station, such as a local communication tower, or hand-held remote controller. However, aerial robotic vehicles may experience communication problems when the servicing base station is located above the aerial robotic vehicle and the aerial robotic vehicle antenna is located on the bottom of the aerial robotic vehicle or when the servicing base station is located below the aerial robotic vehicle and the aerial robotic vehicle antenna is located on top of the aerial robotic vehicle.

SUMMARY

Various embodiments include methods that may be implemented in a processor or processing device for managing communications of an aerial robotic vehicle having two antennas (i.e., a first antenna and a second antenna) that are separated from one another on the vehicle. Various embodiments may include receiving position information identifying a location of the aerial robotic vehicle, determining whether to switch from using the first antenna to using the second antenna for active communications of the aerial robotic vehicle based on the position information, and switching active communications from using the first antenna to using the second antenna in response to determining to switch from using the first antenna to using the second antenna for active communications of the aerial robotic vehicle.

Some embodiments may further include accessing a database correlating aerial robotic vehicle positions to whether to use a particular one of the first and second antennas for active communications, in which determining whether to switch from using the first antenna to using the second antenna may be further based on information in the database indicating whether a particular antenna should be used for active communications based on the location of the aerial robotic vehicle.

Some embodiments may further include comparing a first signal quality using the first antenna to a second signal quality using the second antenna, in which switching active communications from using the first antenna to using the second antenna may be performed in response to the second signal quality exceeding the first signal quality.

Some embodiments may further include accessing a database correlating aerial robotic vehicle positions to whether an active signal quality comparison should be performed, in which comparing the first signal quality using the first antenna to the second signal quality using the second antenna may be performed in response to the database indicating that the active signal quality comparison should be performed based on the location of the aerial robotic vehicle.

Some embodiments may further include accessing a database correlating aerial robotic vehicle positions along at least one planned route of the aerial robotic vehicle to whether an active signal quality comparison should be performed, in which comparing the first signal quality using the first antenna to the second signal quality using the second antenna may be performed in response to the database indicating that the active signal quality comparison should be performed based on the location of the aerial robotic vehicle.

In some embodiments, switching active communications from using the first antenna to using the second antenna may include switching active communications from using only the first antenna to using both the first and second antennas.

In some embodiments, the first antenna may be configured to receive or transmit signals from above the aerial robotic vehicle better than the second antenna and the second antenna may be configured to receive or transmit signals from below the aerial robotic vehicle better than the first antenna. In some embodiments, the first antenna may be disposed on an upper side of the aerial robotic vehicle and the second antenna may be disposed on a lower side of the aerial robotic vehicle.

In some embodiments, the position information may include an altitude of the aerial robotic vehicle and the location of the aerial robotic vehicle may include the altitude and geographic coordinates of the aerial robotic vehicle. In some embodiments, the position information may include environmental information related to conditions near the aerial robotic vehicle. In some embodiments, the position information identifies the location of the aerial robotic vehicle relative to one or more servicing base stations. In some embodiments, the position information may include a speed or velocity of the aerial robotic vehicle.

Further embodiments may include an aerial robotic vehicle having a first antenna, a second antenna and a processor configured with processor executable instructions to perform operations of the methods summarized above. Further embodiments may include an aerial robotic vehicle having means for performing functions of the methods summarized above. Further embodiments may include a processing device configured for use in an aerial robotic vehicle and configured to perform operations of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Figure 1:
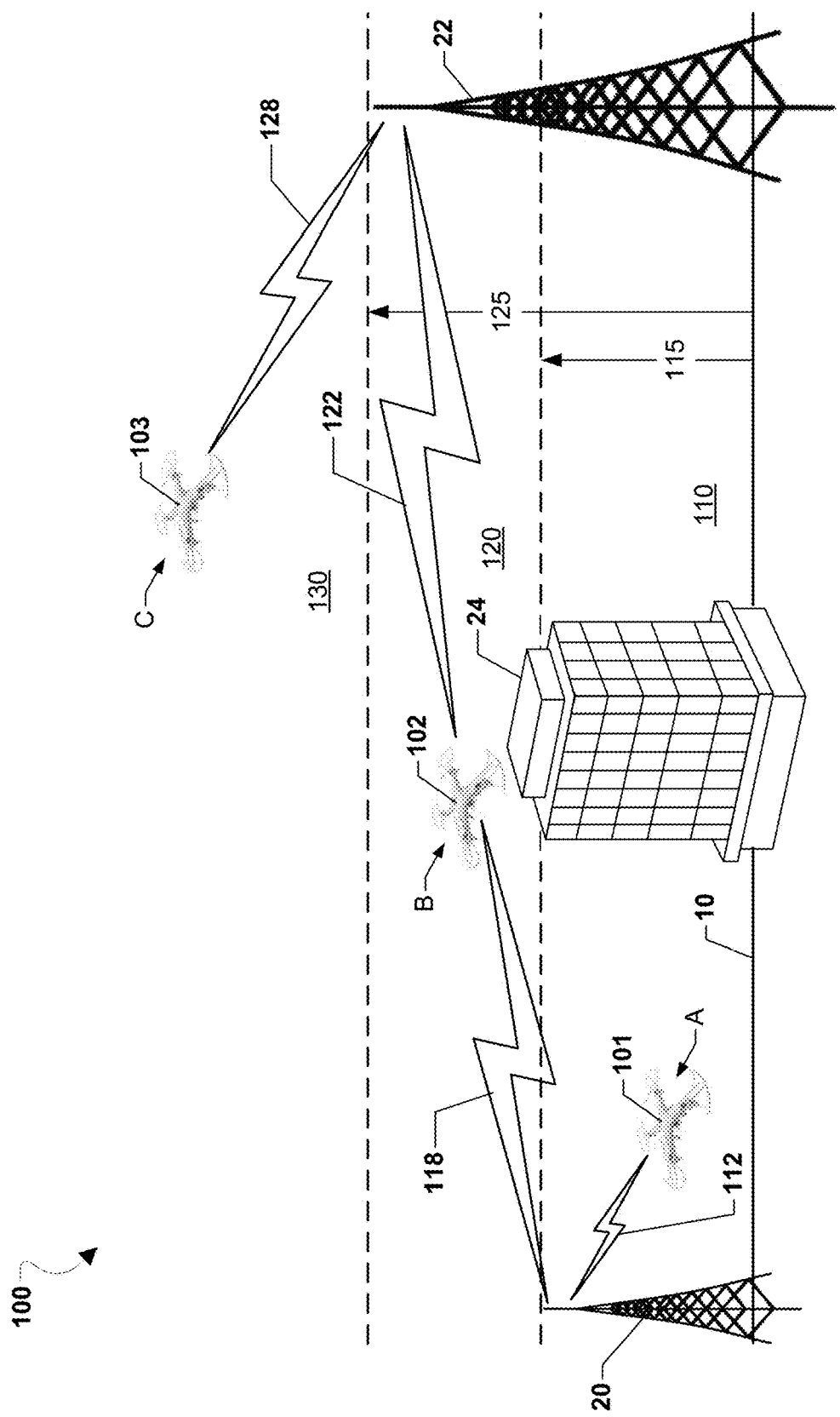
FIG. 1 is a schematic diagram of a communication environment suitable for use of various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments provide methods of managing antennas used for communications by an aerial robotic vehicle having at least two antennas spaced apart from one another on the body of the aerial robotic vehicle. In various embodiments, a processor (e.g., a processor of the aerial robotic vehicle or a processor in a remote computing device) may receive position information, such as information identifying the location of the aerial robotic vehicle, and use the position information to determine whether to switch from using one antenna (i.e., a first antenna) to using another antenna (i.e., a second antenna) for active communications of the aerial robotic vehicle. The position information may include the altitude of the aerial robotic vehicle and a geographic location of the aerial robotic vehicle, environmental information related to conditions near the aerial robotic vehicle, and/or identify a position of the aerial robotic vehicle relative to one or more servicing base stations. Additionally or alternatively, the position information may include a velocity of the aerial robotic vehicle, which combined previous position information and predetermined flight path information, may be used to calculate a current location of the aerial robotic vehicle. The determination to switch antennas may be based on a comparison of signal quality from the two antennas, a database correlating aerial robotic vehicle position to the use of a particular antenna, a schedule for switching antennas, or a combination thereof. Switching from using one antenna to using another antenna may increase antenna gain, which may reduce the current needed for transmitting and/or receiving communication signals and thus conserve power. In addition, switching from using one antenna to using another antenna may improve received and/or transmitted signal quality for the aerial robotic vehicle.

In various embodiments, the first antenna of the two antennas may be configured to transmit signals to or receive signals from above the aerial robotic vehicle better than a second antenna of the two antennas, while the second antenna is configured to transmit signals to or receive signals from below the aerial robotic vehicle better than the first antenna. For example, the first antenna may be disposed on an upper side of the aerial robotic vehicle and the second antenna may be disposed on a lower side of the aerial robotic vehicle. In addition, each of the first and/or second antennas may include an array of antennas (i.e., more than one antenna). Each array of antennas may include individual antennas pointing in different directions.

As used herein, the term "aerial robotic vehicle" refers to various types of vehicles that are capable of autonomous flight and that include at least a processing unit for controlling flight of the vehicle according to stored instructions (e.g., data indicating a predetermined flight plan, etc.). Aerial robotic vehicles may be of various design types capable of executing vertical lift-offs, such as helicopter-type drones configured with any number of rotors (e.g., quad-copter aerial robotic vehicles having four rotors, etc.). Although aerial robotic vehicles may be selectively controlled by human operators, aerial robotic vehicles may be capable of independently performing at least a series of instructions, commands, and/or routines for testing flight stability as described herein. An aerial robotic vehicle includes a control system including a processor for executing processor-executable instructions for controlling the various functionalities of the aerial robotic vehicle, such as communications (e.g., wireless signaling via Wi-Fi®, Bluetooth®, Long Term Evolution (LTE), etc.), data collection (e.g., polling sensors, etc.), propulsion/navigation, power management, and stability management (e.g., calculating center-of-gravity, etc.). Aerial robotic vehicles may or may not be configured to carry payloads during missions, such as surveillance aerial robotic vehicles configured merely to travel to various locations in order to capture camera imagery or delivery aerial robotic vehicles configured to drop-off packages to a destination address and return to an address of origin.

An aerial robotic vehicle may include an onboard processor configured to operate the aerial robotic vehicle without remote operating instructions (i.e., autonomously), such as from a human operator or remote computing device. Alternatively, the onboard processor may be configured to operate the aerial robotic vehicle with some remote operating instruction or updates to instructions stored in a memory of the onboard processor (i.e., controlled remotely or semi-autonomously). In addition, an aerial robotic vehicle may be propelled for flight using a plurality of propulsion units, each including one or more rotors, that provide propulsion and/or lifting forces for the aerial robotic vehicle.

As used herein, the term "computing device" refers to an electronic device equipped with at least a processor. Examples of computing devices include processors within a controller and the drone control system and/or mission management computer that are onboard the drone, as well as remote computing devices communicating with the drone configured to perform operations of the various embodiments. Computing devices implemented in base stations or other structures may include wireless communication devices (e.g., cellular telephones, wearable devices, smartphones, web-pads, tablet computers, Internet enabled cellular telephones, Wi-Fi® enabled electronic devices, personal data assistants (PDAs), laptop computers, etc.), personal computers, and servers. In various embodiments, computing devices may be configured with memory and/or storage. Additionally, computing devices referred to in the various example embodiments may be coupled to or include wireless communication capabilities implementing various embodiments, such as network transceiver(s) and antenna(s) configured to establish a local area network (LAN) connection (e.g., Wi-Fi® transceivers).

Various embodiments may be implemented in an aerial robotic vehicle operating within communication environments, an example of which is illustrated in FIG. 1. The example communication environment 100 includes a first base station 20 with an antenna fixed at a first altitude 115 and a second base station 22 with an antenna fixed at a second altitude 125. The communication environment 100 also includes three aerial robotic vehicles 101, 102, 103 to illustrate how wireless communications with the first and second base stations 20, 22 may be effected by aerial positions of each aerial robotic vehicle 101, 102, 103 relative to the first and second base stations 20, 22. Such aerial positions may be grouped into three communication regions 110, 120, 130, defined by positions of the aerial robotic vehicle relative to the first and second altitudes 115, 125 (i.e., the first and second base stations 20, 22). The first communication region 110 extends between the ground 10 and a first altitude 115. The second communication region 120 extends between the first altitude 115 and a second altitude 125. The third communication region 130 includes all the space above the second altitude 125.

Communications with the first or second base stations 20, 22 by an aerial robotic vehicle (e.g., aerial robotic vehicles 101, 102, 103) may be affected by a position of the aerial robotic vehicle relative to the base stations 20, 22. Also, intermediate obstructions, such as a building 24, may impact the signal quality of such communications between the aerial robotic vehicle 101, 102, 103 and the base stations 20, 22. Thus, for illustrative purposes, each of the aerial robotic vehicles 101, 102, 103 is shown located in a corresponding different one of the three communication regions 110, 120, 130. Also, in accordance with various embodiments, the three aerial robotic vehicles 101, 102, 103 include a first antenna optimized for transmitting signals to or receiving signals from above the aerial robotic vehicle and a second antenna optimized for transmitting signals to or receiving signals from below the aerial robotic vehicle.

The first communication region 110 may represent an operating environment in which the only available wireless access point(s) are located above the aerial robotic vehicle (e.g., 101) and/or the only signals providing a wireless communication link (e.g., 112) are directed at the aerial robotic vehicle (e.g., 101) from above. The first aerial robotic vehicle 101, operating within the first communication region 110 and thus positioned below the first altitude 115, may optimize communications by using an antenna disposed on an upper side of the aerial robotic vehicle. An upper side antenna may be better suited for handling signals providing a wireless communication link 112 to/from above the first aerial robotic vehicle 101. The location of the first aerial robotic vehicle 101 may be determined from position information (i.e., received from an onboard altimeter, a satellite navigation unit, an airspeed/groundspeed indicator, and/or a remote computing device) indicating, directly or indirectly, that the first aerial robotic vehicle 101 is located at position A. For example, the onboard altimeter and/or satellite navigation unit may provide a direct indication of altitude and/or location; while the velocity of the aerial robotic vehicle (i.e., measured with an airspeed/groundspeed indicator) may be combined with previous position information (i.e., last known/estimated position) and predetermined flight path information to calculate a current altitude and/or location. The position information may be used by the first aerial robotic vehicle 101 to determine the antenna that should be used for active communications. For example, since position A is below both the first and second altitudes 115, 125 (i.e., corresponding to the first and second base stations 20, 22), when the first aerial robotic vehicle 101 is in the position A, the upper side antenna may automatically be used.

The second communication region 120 represents an operating environment in which wireless access point(s) are located both above and below the aerial robotic vehicle (e.g., 102) and/or the signals providing a wireless communication link (e.g., 118, 122) are directed at the aerial robotic vehicle (e.g., 101) from both above and below. The second aerial robotic vehicle 102, operating within the second communication region 120 and thus between the first altitude 115 and the second altitude 125, may be able to use either an upper side antenna or a lower side antenna for wireless communications. Thus, the second aerial robotic vehicle 102 may be positioned for handling signals providing a wireless communication link 118 to/from below the second aerial robotic vehicle 102 or for handling signals providing a wireless communication link 122 to/from above the second aerial robotic vehicle 102. The location of the second aerial robotic vehicle 102 may be determined from position information that indicates the second aerial robotic vehicle 102 is located at position B. Thus, the position information may be inconclusive regarding the antenna that the second aerial robotic vehicle 102 should use for active communications. Thus, when the second aerial robotic vehicle 102 is in the second communication region 120, a processor of the aerial robotic vehicle may obtain signal quality measurements from both antennas and compare a first signal quality obtained using the upper side antenna to a second signal quality obtained using the lower side antenna in order to select a better one of the two (or more) antennas to use for wireless communications. Although one of the two base stations 20, 22 may be closer to the second aerial robotic vehicle 102, local conditions (e.g., interference from the building 24) may affect the quality of the wireless communication links 118, 122. Alternatively, when the second aerial robotic vehicle 102 is in the second communication region 120, the aerial robotic vehicle may use both the upper side and lower side antennas may be used.

The third communication region 130 represents an aerial robotic vehicle operating environment in which the only available wireless access point(s) are located below the aerial robotic vehicle (e.g., 103) and/or the only signals providing a wireless communication link (e.g., 128) are directed at the aerial robotic vehicle (e.g., 103) from below. The third aerial robotic vehicle 103, operating within the third communication region 130 and thus above the second altitude 125, may optimize wireless communications by using an antenna disposed on a lower side of the aerial robotic vehicle. A lower side antenna may be better suited for handling signals providing a wireless communication link 128 to/from below the third aerial robotic vehicle 103. The location of the third aerial robotic vehicle 103 may be determined from position information that indicates the third aerial robotic vehicle 103 is located at position C. The position information may be used by the third aerial robotic vehicle 103 to determine the antenna that should be used for active communications. For example, since position C is above both the first and second altitudes 115, 125 (i.e., corresponding to the first and second base stations 20, 22), when the third aerial robotic vehicle 103 is in the position C, the lower side antenna may automatically be used.

Each of the wireless communication links 112, 118, 122, and 128 may include a plurality of carrier signals, frequencies, or frequency bands, each of which may include a plurality of logical channels. Each of the wireless communication links 112, 118, 122, and 128 may utilize one or more radio access technologies (RATs). Examples of RATs that may be used in one or more of the various wireless communication links 112, 118, 122, and 128 include 3GPP Long Term Evolution (LTE), 3G, 4G, 5G, Global System for Mobility (GSM), Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication environments 100, 200 include medium range protocols such as Wi-Fi, LTE-U, LTE-Direct, LAA, MuLTEfire, and relatively short range RATs such as ZigBee, Bluetooth, and Bluetooth Low Energy (LE).

Figure 2:
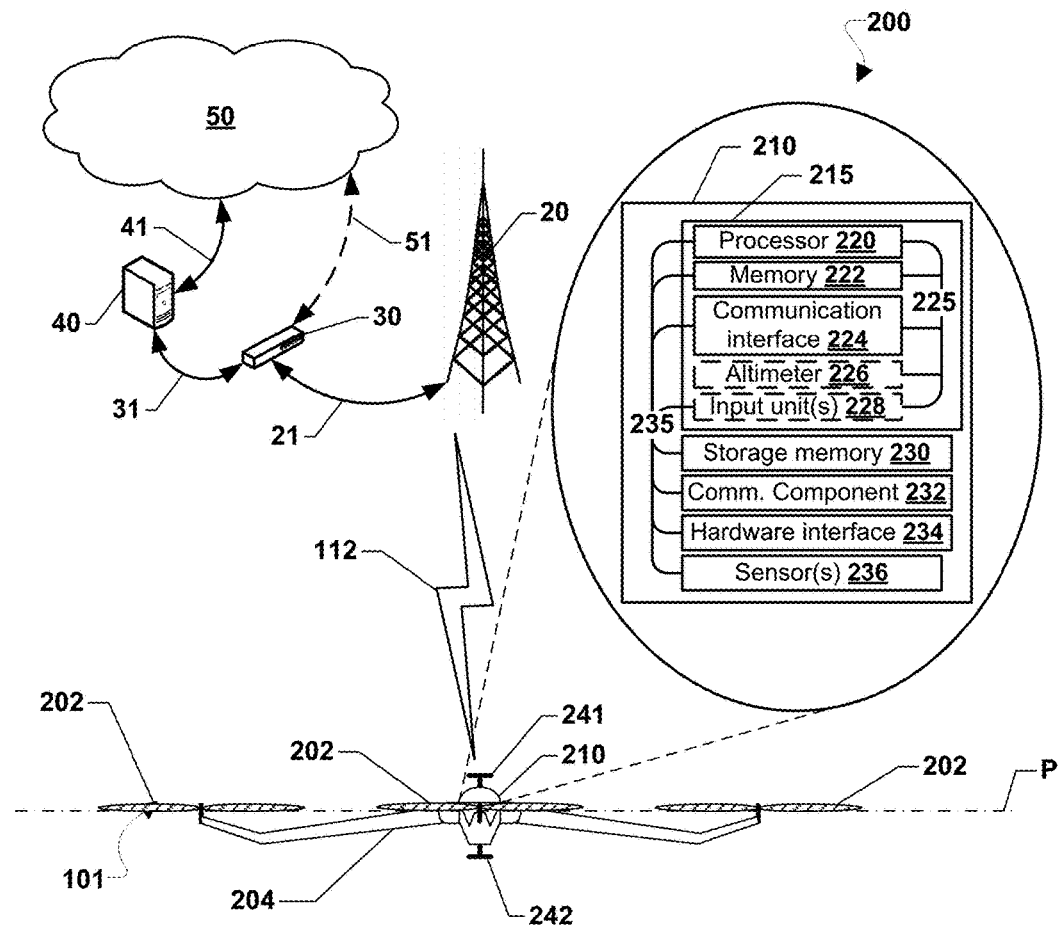
FIG. 2 is a schematic diagram illustrating an aerial robotic vehicle, a communication network, and components thereof according to various embodiments.

Various embodiments may be implemented within a variety of aerial robotic vehicles configured to communicate with one or more communication networks, an example of which suitable for use with various embodiments is illustrated in FIG. 2. With reference to FIGS. 1 and 2, the communication environment 200 may include the aerial robotic vehicle 101 and the base station 20, as well as a local computing device 30, a remote server 40, and a communication network 50.

The base station 20 may provide a wireless connection, such as through wireless signals 112 to the aerial robotic vehicle 101. The base station 20 may include one or more wired and/or wireless communications connections 21, 31, 41, 51 to the communication network 50. The communication network 50 may in turn provide access to other remote base stations over the same or another wired and/or wireless communications connection. The local computing device 30 may be configured to control the base station 20, the aerial robotic vehicle 101, and/or control wireless communications over a wide area network, such as providing a wireless access points and/or other similar network access point using the base station 20. In addition, the local computing device 30 and/or the communication network 50 may provide access to a remote server 40. The aerial robotic vehicle 101 may be configured to communicate with the local computing device 30 and/or the remote server 40 for exchanging various types of communications and data, including location information, navigational commands, data inquiries, and mission data.

The terms "server" or "remote server" are used herein interchangeably to refer to any computing device capable of functioning as a server, such as a master exchange server, web server, and a personal or mobile computing device configured with software to execute server functions (e.g., a "light server"). Thus, various computing devices may function as a server 40, such as any one or all of cellular telephones, smart-phones, web-pads, tablet computers, Internet enabled cellular telephones, wide area network (WAN) enabled electronic devices, laptop computers, personal computers, a computing device specific to the base station 20, the local computing device 30, and similar electronic devices equipped with at least a processor, memory, and configured to communicate with an aerial robotic vehicle. The server 40 may be a dedicated computing device or a computing device including a server module (e.g., running an application that may cause the computing device to operate as a server). A server module (or server application) may be a full function server module, or a light or secondary server module (e.g., light or secondary server application). A light server or secondary server may be a slimmed-down version of server type functionality that can be implemented on a personal or mobile computing device, such as a smart phone, thereby enabling it to function as an Internet server (e.g., an enterprise e-mail server) to a limited extent, such as necessary to provide the functionality described herein.

The aerial robotic vehicle 101 may include a number of rotors 202 and a body 204 (i.e., fuselage, frame, etc.) that may be made out of any combination of plastic, metal, or other materials suitable for flight. The body 204 may provide structural support for the motors associated with the rotors 202. For ease of description and illustration, some detailed aspects of the aerial robotic vehicle 101 are omitted such as a power source, wiring, frame structure, interconnects, or other features that would be known to one of skill in the art. Various embodiments may also be implemented with other types of aerial robotic vehicles, including other types of autonomous aircraft, land vehicles, waterborne vehicles, or a combination thereof.

The aerial robotic vehicle 101 may include a processing device 210 that is configured to monitor and control the various functionalities, subsystems, and/or other components of the aerial robotic vehicle 101. For example, the processing device 210 may be configured to monitor and control various functionalities of the aerial robotic vehicle 101, such as any combination of modules, software, instructions, circuitry, hardware, etc. related to propulsion, navigation, power management, sensor management, and/or stability management.

The processing device 210 may house various circuits and devices used to control the operation of the aerial robotic vehicle 101. For example, the processing device 210 may include a processor 220, such as one or more processors configured to execute processor-executable instructions (e.g., applications, routines, scripts, instruction sets, etc.) to control flight, antenna usage, and other operations of the aerial robotic vehicle 101, including operations of various embodiments. In some embodiments, the processing device 210 may include memory 222 coupled to the processor 220 and configured to store data (e.g., flight plans, obtained sensor data, received messages, applications, etc.). The processing device 210 may further include avionic sensors, such as an altimeter 226, that may be used by the processor 220 to determine flight attitude and location information to control various processes on the aerial robotic vehicle 200. For example, in some embodiments, the processor 220 may use data from an altimeter 226 as an input for determining whether to switch the active antenna or measure signal qualities of different antennas. Other inputs 228 may also be coupled to the processor. The processor 220 and memory 222, along with (but not limited to) additional elements such as a communication interface 224, the altimeter 226, and one or more input unit(s) 228, may be configured as or included in a system-on-chip (SoC) 215.

The processing device 210 may include more than one SoC 215 thereby increasing the number of processors 220 and processor cores. The processing device 210 may also include processors 220 that are not associated with an SoC 215. Individual processors 220 may be multi-core processors. The processors 220 may each be configured for specific purposes that may be the same as or different from other processors 220 of the processing device 210 or SoC 215. One or more of the processors 220 and processor cores of the same or different configurations may be grouped together. A group of processors 220 or processor cores may be referred to as a multi-processor cluster.

The terms "system-on-chip" or "SoC" as used herein refer to a set of interconnected electronic circuits typically, but not exclusively, including one or more processors (e.g., 220), a memory (e.g., 222), and a communication interface (e.g., 224). The SoC 215 may include a variety of different types of processors 220 and processor cores, such as a general purpose processor, a central processing unit (CPU), a digital signal processor (DSP), a graphics processing unit (GPU), an accelerated processing unit (APU), a subsystem processor of specific components of the processing device, such as an image processor for a camera subsystem or a display processor for a display, an auxiliary processor, a single-core processor, and a multicore processor. The SoC 215 may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

The SoC 215 may include one or more processors 220. The processing device 210 may include more than one SoC 215, thereby increasing the number of processors 220 and processor cores. The processing device 210 may also include processors 220 that are not associated with the SoC 215 (i.e., external to the SoC 215). Individual processors 220 may be multi-core processors. The processors 220 may each be configured for specific purposes that may be the same as or different from other processors 220 of the processing device 210 or the SoC 215. One or more of the processors 220 and processor cores of the same or different configurations may be grouped together. A group of processors 220 or processor cores may be referred to as a multi-processor cluster.

The processing device 210 may further include one or more sensor(s) 236, such as an altimeter or camera, that may be used by the processor 220 to determine flight attitude and location information to control various processes on the drone 101. For example, in some embodiments, the processor 220 may use data from sensors 236 (e.g., a light sensor using photoresistors, photodiodes, and/or phototransistors) as an input for determining whether to invert the drone 101. One or more other input units 228 may also be coupled to the processor 220. Various components within the processing device 210 and/or the SoC 215 may be coupled together by various circuits, such as a bus 225, 235 or another similar circuitry.

In various embodiments, the processing device 210 may include or be coupled to communication resources 232, such as a wireless transceiver, a first antenna 241, and a second antenna 242 for transmitting and receiving wireless signals through a wireless communication link 112. The one or more communication components 232 may be coupled to the communication interface 224 and may be configured to handle wireless wide area network (WWAN) communication signals (e.g., cellular data networks) and/or wireless local area network (WLAN) communication signals (e.g., Wi-Fi signals, Bluetooth signals, etc.) associated with ground-based transmitters/receivers (e.g., base stations, beacons, Wi-Fi access points, Bluetooth beacons, small cells (picocells, femtocells, etc.), etc.). The communication components 232 may receive data from radio nodes, such as navigation beacons (e.g., very high frequency (VHF) omni-directional range (VOR) beacons), Wi-Fi access points, cellular network base stations, radio stations, etc.

The processing device 210, using the processor 220, the communication interface 224, communication components 232, and at least one of the first and second antennas 241, 242, may be configured to conduct wireless communications with a variety of wireless communication devices, examples of which include a base station or cell tower (e.g., base stations 20, 22), a beacon, server, a smartphone, a tablet, or another computing device with which the aerial robotic vehicle 101 may communicate. The processor 220 may establish a bi-directional wireless communication link (e.g., 112, 118, 122, and 128) via a modem and at least one of the first and second antennas 241, 242. In some embodiments, the communication interface 224 may be configured to support multiple connections with different wireless communication devices using different radio access technologies. In some embodiments, the communication interface 224 and the processor 220 may communicate over a secured communication link. The security communication links may use encryption or another secure means of communication in order to secure the communication between the communication interface 224 and the processor 220.

The first antenna 241 may be configured to receive or transmit signals from above the aerial robotic vehicle 101 better than the second antenna 242 that is positioned below the aerial robotic vehicle. For example, the first antenna 241 may be disposed on an upper side of the aerial robotic vehicle 101, which has more exposure and less interference to signals received from or transmitted to that upper side of the aerial robotic vehicle 101. The first antenna 241 may extend directly away from a plane P of the rotors 202 or otherwise be configured to equally receive signals directed at any oblique angle to the upper side of the aerial robotic vehicle 101. Alternatively, the first antenna 241 may be titled in one direction, such as a preferred forward direction of the aerial robotic vehicle 101. However, with the first antenna 241 tilted or biased in one direction, the second antenna 242 located on the lower side of the aerial robotic vehicle may also be tilted or biased in an opposite direction (e.g., opposite the preferred forward direction of the aerial robotic vehicle 101).

The second antenna 242 may be configured to receive or transmit signals from below the aerial robotic vehicle 101 better than the first antenna 241. For example, the second antenna 242 may be disposed on a lower side of the aerial robotic vehicle 101, which has more exposure and less interference to signals received from or transmitted to that lower side of the aerial robotic vehicle 101. Like the first antenna 241, the second antenna 242 may extend perpendicular to a plane P of the rotors 202 or otherwise be configured to equally receive signals directed at any oblique angle to the lower side of the aerial robotic vehicle 101. As noted above, the second antenna 242 may be titled or biased in one direction.

While the various components of the processing device 210 are illustrated as separate components, some or all of the components (e.g., the processor 220, the memory 222, and other units) may be integrated together in a single device or module, such as a system-on-chip module.

Aerial robotic vehicles may navigate or determine positioning using altimeters or satellite navigation systems, such as Global Navigation Satellite System (GNSS), Global Positioning System (GPS), etc. In some embodiments, the aerial robotic vehicle 101 may use an alternate source of positioning signals (i.e., other than GNSS, GPS, etc.). The aerial robotic vehicle 101 may use position information associated with the source of the alternate signals together with additional information (e.g., dead reckoning in combination with last trusted GNSS/GPS location, dead reckoning in combination with a position of the aerial robotic vehicle takeoff zone, etc.) for positioning and navigation in some applications. Thus, the aerial robotic vehicle 101 may navigate using a combination of navigation techniques, including dead-reckoning, camera-based recognition of the land features below and around the aerial robotic vehicle 101 (e.g., recognizing a road, landmarks, highway signage, etc.), etc. that may be used instead of or in combination with GNSS/GPS location determination and triangulation or trilateration based on known locations of detected wireless access points.

In some embodiments, the processing device 210 of the aerial robotic vehicle 101 may further include various input units 228 for receiving control instructions, data from human operators or automated/pre-programmed controls, and/or for collecting data indicating various conditions relevant to the aerial robotic vehicle 101. For example, the various input units 228 may include camera(s), microphone(s), sensor(s), position information functionalities (e.g., a GPS receiver for receiving GPS coordinates), flight instruments (e.g., attitude indicator(s), gyroscope(s), accelerometer(s), altimeter(s), compass(es), etc.), keypad(s), etc. The various components of the processing device 210 may be connected via a bus 215 or another similar circuitry.

Aerial robotic vehicles may be winged or rotor craft varieties. For example, the aerial robotic vehicle 101 may be a rotary propulsion design that utilizes one or more rotors 202 driven by corresponding motors to provide lift-off (or take-off) as well as other aerial movements (e.g., forward progression, ascension, descending, lateral movements, tilting, rotating, etc.). The aerial robotic vehicle 101 is illustrated as an example of an aerial robotic vehicle that may utilize various embodiments, but is not intended to imply or require that various embodiments are limited to rotor craft aerial robotic vehicles. Instead, various embodiments may be use with winged aerial robotic vehicles. Further, various embodiments may equally be used with land-based autonomous vehicles, water-borne autonomous vehicles, and space-based autonomous vehicles.

Figure 3:
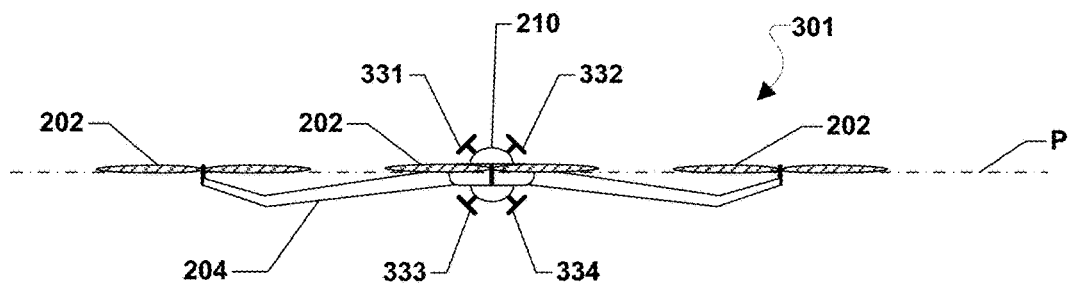
FIG. 3 is a schematic diagram illustrating an aerial robotic vehicle and components thereof according to various embodiments.

FIG. 3 illustrates a schematic side elevation view of an aerial robotic vehicle 301 with more than two antennas in accordance with some embodiments. With reference to FIGS. 1-3, the aerial robotic vehicle 301 may be similar to the aerial robotic vehicles 101, 102, and 103 in many aspects. Additionally, the aerial robotic vehicle 301 may include a first antenna 331, a second antenna 332, a third antenna 333, and a fourth antenna 334.

The first and second antennas 331, 332 may be configured to receive or transmit signals from above the aerial robotic vehicle 301 better than the third and fourth antennas 333, 334. For example, the first and second antennas 331, 332 may be disposed on an upper side of the aerial robotic vehicle 301, which has more exposure and less interference to signals received from or transmitted to that upper side of the aerial robotic vehicle 301. The first antenna 331 extends upwardly away from a plane P of the rotors 202, while also tilting in a first direction (e.g., to the left as illustrated in FIG. 3). In this way, the first antenna 331 may be configured to better receive signals directed at the upper side of the aerial robotic vehicle 301 and coming from the first direction. Like the first antenna 331, the second antenna 332 extends upwardly away from a plane P of the rotors 202. However, in contrast to the first antenna 331, the second antenna is tilted or biased in a second direction, opposite the first direction (e.g., to the right as illustrated in FIG. 3).

The third and fourth antennas 333, 334 may be configured to receive or transmit signals from below the aerial robotic vehicle 301 better than the first and second antennas 331, 332. For example, the third and fourth antennas 333, 334 may be disposed on a lower side of the aerial robotic vehicle 301, which has more exposure and less interference to signals received from or transmitted to that lower side of the aerial robotic vehicle 301. The third antenna 333 extends downwardly away from a plane P of the rotors 202, while also tilting in the same first direction as the first antenna 331 (e.g., to the left as illustrated in FIG. 3). In this way, the third antenna 333 may be configured to better receive signals directed at the lower side of the aerial robotic vehicle 301 and coming from the first direction. Like the third antenna 333, the fourth antenna 334 extends downwardly away from a plane P of the rotors 202. However, in contrast to the third antenna 333, the fourth antenna 334 is tilted or biased in same second direction as the second antenna 332, opposite the first direction (e.g., to the right as illustrated in FIG. 3).

Figure 4:
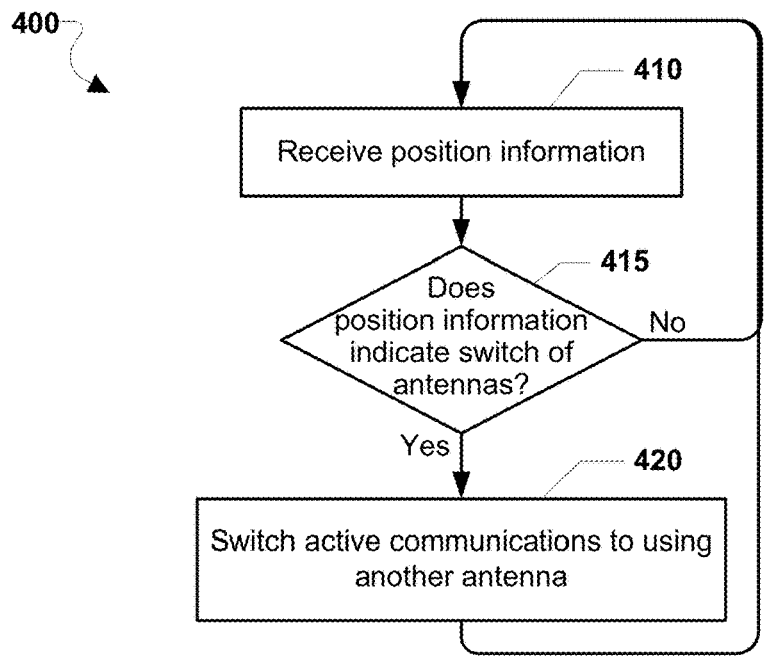
FIG. 4 is a process flow diagram illustrating a method of managing antennas used for communications of an aerial robotic vehicle according to various embodiments.

FIG. 4 illustrates a method 400 of managing communications of an aerial robotic vehicle according to various embodiments. With reference to FIGS. 1-4, the method 400 may be implemented by a processor (e.g., 220) of the aerial robotic vehicle (e.g., 101, 102, 103, 301). In some embodiments, the method 400 may also be implemented by (in addition to or as an alternative of) a processor of a remote computing device (e.g., a local computing device 30 or a remote server 40) that sends instructions to the processor of the aerial robotic vehicle. For example, a remote computing device may perform some of the operations of the method 400 and send instructions to a processor on the aerial robotic vehicle (e.g., a control processor or a modem processor). For ease of description, the term "processor" is used in the description of the method 400 to refer to either a processor of the aerial robotic vehicle, a processor of a remote computing device and a combination of both.

In block 410, the processor may receive position information identifying a location of the aerial robotic vehicle. For example, the processor of the aerial robotic vehicle may receive position information from onboard sensors, such as an altimeter (e.g., 226) and/or a GNSS/GPS receiver. Alternatively, the processor of the aerial robotic vehicle may receive position information from a remote computing device. As another example, the processor may receive a message from a local computing device 30, a remote server 40, and/or a communication network 50 (e.g., via at least one base station 20, 22) including position information or signals useful for identifying a location of the aerial robotic vehicle. In addition, the received position information may include environmental information related to the position of the aerial robotic vehicle. For example, environmental information may include wind speeds, temperature, air quality/composition, weather, and similar information related to conditions surrounding or near the aerial robotic vehicle that may affect antenna usage, effectiveness, or efficiency. Such a received message including position information may be pushed to the aerial robotic vehicle (i.e., not specifically requested) or received in response to a request for such information transmitted by the aerial robotic vehicle. In some embodiments, the message may include geographic coordinates, altitude, proximity information to obstacles, base stations, and other elements. In embodiments in which the method 400 is implemented (at least partially) by a processor of a remote computing device (e.g., a local computing device 30 or a remote server 40), the remote computing device may determine position information based on information received from the aerial robotic vehicle (e.g., in response to a request, on a periodic basis, etc.).

In determination block 415, the processor may determine whether the position information indicates that it is appropriate to switch from a currently active antenna (i.e., a first antenna) to using another antenna (i.e., a second antenna) for active communications of the aerial robotic vehicle. In some embodiments, the processor may be configured to execute processor-executable instructions for switching antennas or using a particular antenna based on particular predetermined altitudes (i.e., the position information includes the aerial robotic vehicle's altitude). For example, when the aerial robotic vehicle is below a predetermined lower limit altitude (e.g., approximately 100 feet), the processor may be configured to automatically use the antenna disposed on an upper side of the aerial robotic vehicle (e.g., antennas 241, 331, 332). As a further example, when the aerial robotic vehicle is above a predetermined upper limit altitude (e.g., approximately 300 feet), the processor may be configured to automatically use the antenna disposed on a lower side of the aerial robotic vehicle (e.g., antennas 242, 333, 334). As a further example, when the aerial robotic vehicle is at or between the predetermined lower and upper limit altitudes, the processor may be configured to automatically continue using the currently used antenna. The predetermined lower and/or upper limit altitudes at which the processor automatically switches antennas may depend upon the geographic location of the aerial robotic vehicle, such as switching at a higher altitude when flying in a large city with cell based stations mounted on top of buildings, compared to when flying in the countryside with cell base stations mounted on telephone poles or towers. Thus, the predetermined lower and/or upper limit altitudes may be correlated to particular locations, regions, or a combination thereof.

In some embodiments, the position information received in block 410 may include instructions for the aerial robotic vehicle to use a particular antenna for handling communications with the aerial robotic vehicle. In some embodiments, the communication network (e.g., communication network 50) may perform one or more of the operations of the method 400 using telemetry from one or more aerial robotic vehicles (including, for example, altitude information, speed information, vector information, a number of base stations detected by each aerial robotic vehicle, etc.).

In response to determining that the position information indicates that it is appropriate to switch the antenna used for communications of the aerial robotic vehicle (i.e., determination block 415="Yes"), the processor may switch active communications from using the currently used antenna (i.e., the first antenna) to using the other antenna (i.e., the second antenna) in block 420. Otherwise, in response to determining that switching antenna is not indicated (i.e., determination block 415="No"), the processor may continue to receive position information identifying a location of the aerial robotic vehicle in block 410.

The processor may continue to receive position information for identifying a location of the aerial robotic vehicle in block 410 and repeat the operations of determination block 415 and block 420 to adjust the antenna in active use in response to changes in altitude or movements. Thus, the processor may iteratively monitor the location of the aerial robotic vehicle (e.g., from position information) and switch active communications from one antenna to another as the aerial robotic vehicle's location changes. In repeating the operations of determination block 415 and blocks 410 and 420, the antenna currently used for active communication is considered the "currently active antenna" and any other antenna of the aerial robotic vehicle may be considered the "other antenna."

Figure 5:
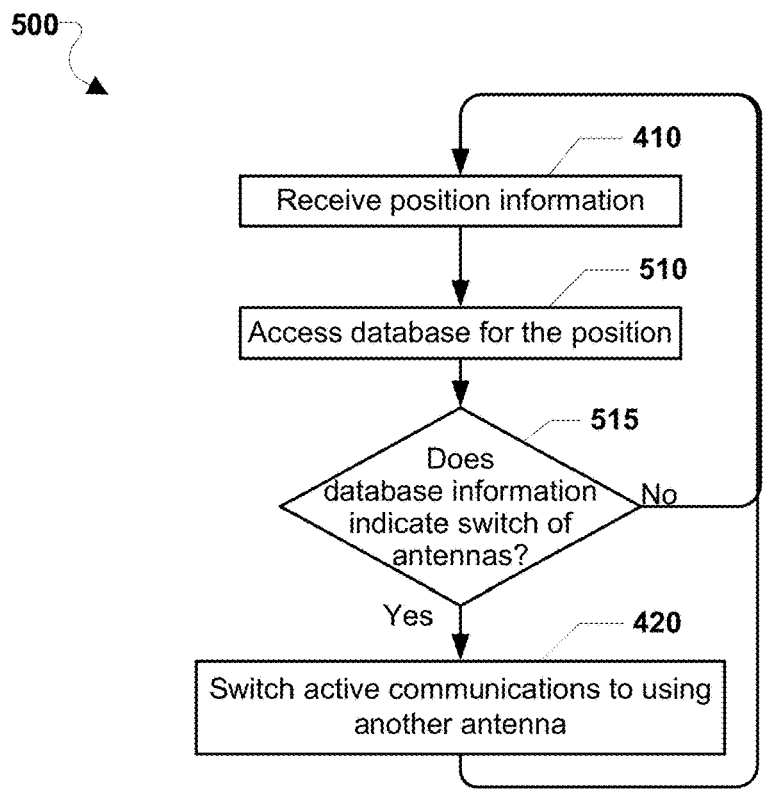
FIG. 5 is a process flow diagram illustrating a method of managing antennas used for communications of an aerial robotic vehicle according to various embodiments.

FIG. 5 illustrates a method 500 of managing communications of an aerial robotic vehicle according to some embodiments. With reference to FIGS. 1-5, the method 500 may be implemented by a processor (e.g., the processor 220) of the aerial robotic vehicle (e.g., 101, 102, 103, and 301). In some embodiments, the method 500 may also be implemented by (in addition to or as an alternative of) a processor of a remote computing device (e.g., a local computing device 30 or a remote server 40) that sends instructions to the processor of the aerial robotic vehicle. For example, a remote computing device may perform some of the operations of the method 400 and send instructions to a processor on the aerial robotic vehicle (e.g., a control processor or a modem processor). For ease of description, the term "processor" is used in the description of the method 400 to refer to either a processor of the aerial robotic vehicle, a processor of a remote computing device and a combination of both. In blocks 410 and 420, the processor may perform operations of like-numbered blocks of the method 400 as described herein.

In block 510, the processor may access information from a database containing information that enables the processor to determine whether to change the active antenna. For example, the database may include information correlating aerial robotic vehicle position to whether to use a particular one of the first and second antennas for active communications. Additionally or alternatively, the database may include information about at least one planned route of the aerial robotic vehicle, including location information of one or more base stations along that route. For example, using such a database and the current position of the aerial robotic vehicle, the aerial robotic vehicle may identify the closest base station and thus which antenna to use at a particular point along the route. If the nearest base station is above the altitude of the aerial robotic vehicle, an upper antenna may be used; and if the nearest base station is below the altitude of the aerial robotic vehicle, a lower antenna may be used. As a further addition or alternative, the database may include previous position information and predetermined flight path information that may be correlated to a current velocity of the aerial robotic vehicle for determining the position of the aerial robotic vehicle. Thus, the velocity of the aerial robotic vehicle may be used for determining whether to change the active antenna. The database may be stored in onboard memory (e.g., memory 222) or in a remote computing device (e.g., a local computing device 30 or a remote server 40) in communication with the aerial robotic vehicle processor. For example, the database may include information about the location and altitude of the closest base stations.

In determination block 515, the processor may determine whether information obtained from the database, possibly combined with the aerial robotic vehicle's position information indicates that it is appropriate to switch from using the currently used antenna (i.e., the first antenna) to using another antenna (i.e., the second antenna). For example, information obtained from the database may identify the threshold altitudes appropriate for the current geographic position, in which case the processor may compare the current altitude position information to the identified threshold altitudes to determine whether the active antenna should be switched. As another example, information obtained from the database may specify the antenna to be used at the current geographic position, in which case the processor may compare the current antenna in use to the specified antenna identified in the information from the database to determine whether the active antenna should be switched.

In response to determining that the database information (perhaps in combination with the position information) indicates that it is appropriate to switch the antenna used for communications of the aerial robotic vehicle (i.e., determination block 515="Yes"), the processor may switch active communications from using the currently used antenna (i.e., the first antenna) to using the other antenna (i.e., the second antenna) in block 420. Otherwise, in response to determining that switching antenna is not indicated (i.e., determination block 515="No"), the processor may continue to receive position information identifying a location of the aerial robotic vehicle in block 410.

In some embodiments, the processor may receive a message, from the local computing device 30, the remote server 40, and/or the communication network 50 (e.g., via at least one base station 20, 22), including information that correlates aerial robotic vehicle position to a particular antenna that should be used or should preferably be used for active communications (i.e., antenna selection information). Such a received message including antenna selection information may be pushed to the aerial robotic vehicle (i.e., not specifically requested) or received in response to a request for such information transmitted by the aerial robotic vehicle. In some embodiments, the message may include a choice of antennas or a hierarchy of antennas to use. In embodiments in which the method 400 is implemented (at least partially) by a processor of a remote computing device (e.g., a local computing device 30 or a remote server 40), the remote computing device may access the database to determine whether to use a particular one of the first and second antennas for active communications, based on information received from the aerial robotic vehicle (e.g., in response to a request, on a periodic basis, etc.), and then communicate the determination to the aerial robotic vehicle via a wireless data link.

The processor may continue to receive position information identifying a location of the aerial robotic vehicle in block 410 and repeat the operations of determination block 415 and blocks 420 and 510. Thus, the processor may iteratively monitor the location of the aerial robotic vehicle (e.g., from position information) and switch active communications from one antenna to another as appropriate in response to a change in altitude or other positional movement. In repeating the operations of determination block 415 and blocks 410, 420 and 510, the antenna currently used for active communication is considered the "currently active antenna" and any other antenna of the aerial robotic vehicle may be considered the "other antenna."

Figure 6:
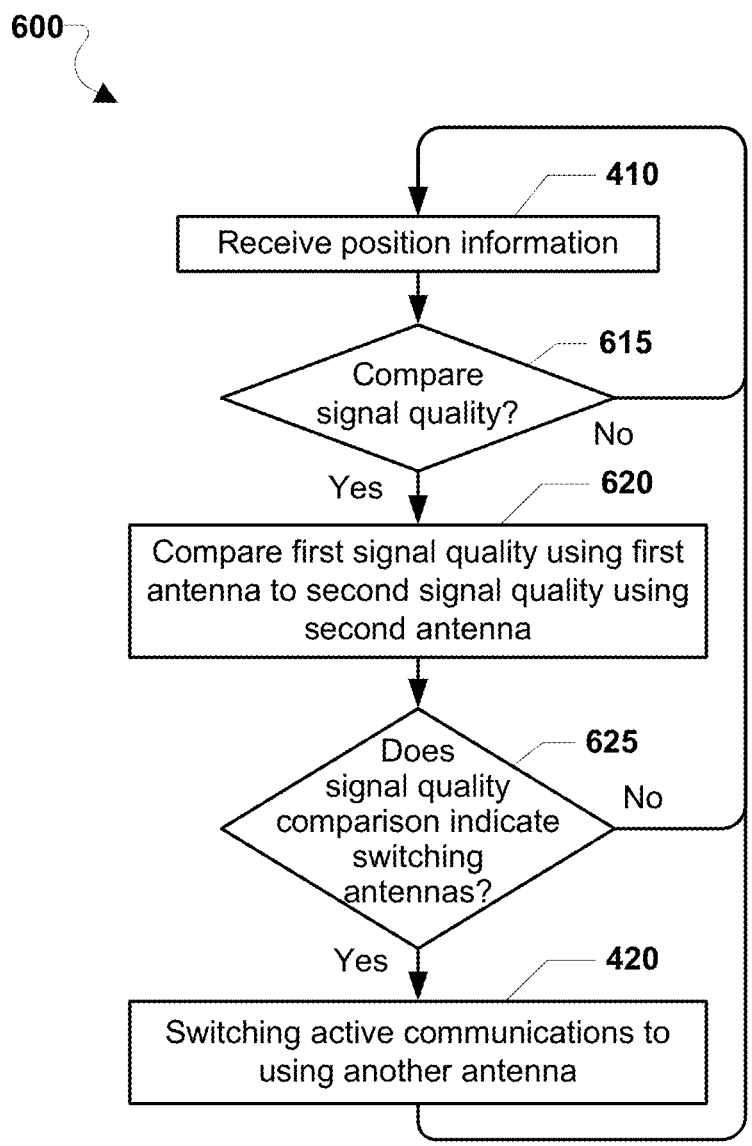
FIG. 6 is a process flow diagram illustrating a method of managing antennas used for communications of an aerial robotic vehicle according to various embodiments.

FIG. 6 illustrates a method 600 of managing communications of an aerial robotic vehicle according to various embodiments. With reference to FIGS. 1-6, the method 600 may be implemented by a processor (e.g., the processor 220) of an aerial robotic vehicle (e.g., 101, 102, 103, and 301). In some embodiments, the method 600 may also be implemented by (in addition to or as an alternative of) a processor of a remote computing device (e.g., the local computing device 30 or the remote server 40) that sends instructions to the processor of the aerial robotic vehicle. For example, a remote computing device may perform some of the operations of the method 400 and send instructions to a processor on the aerial robotic vehicle (e.g., a control processor or a modem processor). For ease of description, the term "processor" is used in the description of the method 400 to refer to either a processor of the aerial robotic vehicle, a processor of a remote computing device and a combination of both. In determination block 415, as well as blocks 410 and 420, the processor may perform operations of like-numbered blocks of the method 400 as described herein.

In determination block 615, the processor may determine whether to compare a first signal quality obtained using the first antenna to a second signal quality obtained using the second antenna based on the position information. The processor may be configured to decide whether to compare antenna signal qualities from two (or more antenna) based on particular predetermined altitudes and/or positions. Obtaining signal quality measurements involves transceiver and processor operations that may temporarily interrupt communications and consume battery power, so making this determination enables the aerial robotic vehicle to save power and maintain communication links when some condition(s) indicates that switching the active antenna is unlikely or that such measurements are unnecessary. For example, at or between 100 feet and 300 feet, the processor may be configured to automatically obtain and compare signal qualities from the two or more. In contrast, below 100 feet and above 300 feet, the processor may be configured to automatically decide not to obtain and compare antenna signal quality measurements because the altitude of the aerial robotic vehicle means that base stations are most likely either above or below the aerial robotic vehicle.

In response to determining that a comparison should be of signal quality of the first and second antennas (i.e., determination block 615="Yes"), the processor may compare a first signal quality using the currently used antenna (i.e., the first antenna) to a second signal quality using the other antenna (i.e., the second antenna) in block 620. The comparison of the first signal quality to the second signal quality in block 620 may be performed to identify which of the first and second antennas has the better signal quality. Signal quality measurements and comparisons may be based upon any of a variety of wireless communication link characteristics or parameters, such as signal strength, signal-to-noise ratio, bit error rates, etc.

In response to determining that a comparison of antenna signal qualities should not be performed (i.e., determination block 615="No"), the processor may continue to receive position information identifying a location of the aerial robotic vehicle in block 410.

In determination block 625, the processor may determine whether the signal quality comparison indicates that it is appropriate to switch from using a currently active antenna (i.e., a first antenna) to using another antenna (i.e., a second antenna) for active communications of the aerial robotic vehicle in block 620. For example, the processor may determine that it is appropriate to switch active communications from using the first antenna to using the second antenna in response to determining that the second signal quality exceeds that of the first signal quality. For example, the processor may determine that active communications should not switch from using the first antenna in response to determining that the second signal quality is equal to or less than that of the first signal quality. As a further example, the processor may determine that it is appropriate to switch from using a currently active antenna (i.e., a first antenna) to using another antenna (i.e., a second antenna) for active communications of the aerial robotic vehicle only if the second antenna signal quality exceeds the signal quality of the first antenna by a threshold difference.

In response to determining that the signal quality comparison indicates that it is appropriate to switch the antenna used for active communications of the aerial robotic vehicle (i.e., determination block 625="Yes"), the processor may switch active communications from the currently used antenna (i.e., the first antenna) to using the other antenna (i.e., the second antenna) in block 420. Otherwise, in response to determining that the currently used antenna should not be switched (i.e., determination block 625="No"), the processor may continue to receive position information for identifying a location of the aerial robotic vehicle in block 410.

The processor may continue to receive position information for identifying a location of the aerial robotic vehicle in block 410 and repeat the operations of determination blocks 615 and 625, as well as blocks 410, 420 and 620, in response to a change in altitude or aerial robotic vehicle movement. Thus, the processor may iteratively monitor the location of the aerial robotic vehicle (e.g., from position information) and switch active communications from one antenna to another as appropriate. In repeating the operations of determination blocks 615 and 625, as well as blocks 410, 420 and 620, the antenna currently used for active communication is considered the "currently active antenna" and any other antenna of the aerial robotic vehicle may be considered the "other antenna."

Figure 7:
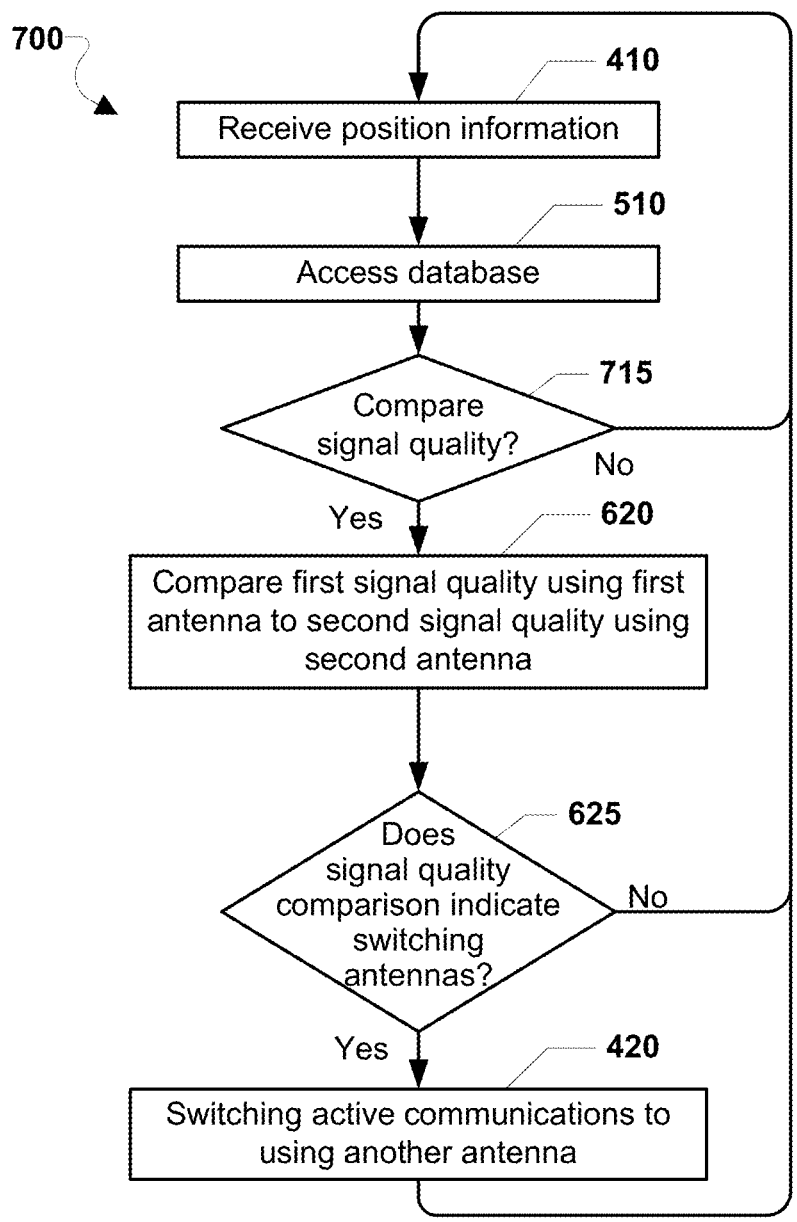
FIG. 7 is a process flow diagram illustrating a method of managing antennas used for communications of an aerial robotic vehicle according to various embodiments.

FIG. 7 illustrates a method 700 of managing communications of an aerial robotic vehicle according to various embodiments. With reference to FIGS. 1-7, the method 700 may be implemented by a processor (e.g., the processor 220 and/or the like) of the aerial robotic vehicle (e.g., 101, 102, 103, and 301). In some embodiments, the method 700 may also be implemented by (in addition to or as an alternative of) a processor of a remote computing device (e.g., a local computing device 30 or a remote server 40) that sends instructions to the processor of the aerial robotic vehicle. For example, a remote computing device may perform some of the operations of the method 400 and send instructions to a processor on the aerial robotic vehicle (e.g., a control processor or a modem processor). For ease of description, the term "processor" is used in the description of the method 400 to refer to either a processor of the aerial robotic vehicle, a processor of a remote computing device and a combination of both. In determination blocks 615 and 625, as well as blocks 410, 420, 510 and 620, the processor may perform operations of like-numbered blocks of the methods 400, 500, and 600 as described.

In determination block 715, the processor may determine whether to compare a first signal quality using the first antenna to a second signal quality using the second antenna based on the information from the database correlating aerial robotic vehicle position to whether to use a particular one of the first and second antennas for active communications accessed in block 510. The database may include information that informs the processor regarding whether to perform (or not perform) the antenna signal quality comparison based on the aerial robotic vehicle's location, altitude, and/or operating conditions. For example, the database may include the altitude and location of base stations, enabling the processor to determine whether nearby base stations are above or below the aerial robotic vehicle. If the database information, in combination with the aerial robotic vehicle's altitude and location information, informs the processor that base station access points are located both above and below the aerial robotic vehicle, the processor may be configured to perform the antenna signal quality comparison. In contrast, if the database information, in combination with the aerial robotic vehicle's altitude and location information, informs the processor that base station access points are only above or only below the aerial robotic vehicle, the processor may be configured to automatically not compare antenna signal quality, but rather use a particular antenna.

In response to determining that a comparison of antenna signal qualities should be performed (i.e., determination block 715="Yes"), the processor may compare a first signal quality obtained using the currently used antenna (i.e., the first antenna) to a second signal quality obtained using the other antenna (i.e., the second antenna) in block 620. Otherwise, in response to determining that the currently used antenna should not be switched (i.e., determination block 625="No"), the processor may continue to receive position information for identifying a location of the aerial robotic vehicle in block 410.

The processor may continue to receive position information for identifying a location of the aerial robotic vehicle in block 410 and repeat the operations of determination blocks 615 and 715, as well as blocks 410, 420, 510, and 620. Thus, the processor may iteratively monitor the location of the aerial robotic vehicle (e.g., from position information) and may switch active communications from one antenna to another in response to a change in altitude or aerial robotic vehicle movement. In repeating the operations of determination blocks 615 and 715, as well as blocks 410, 420, 510, and 620, the antenna currently used for active communication is considered the "currently active antenna" and any other antenna of the aerial robotic vehicle may be considered the "other antenna."

In situations in which the aerial robotic vehicle is in communications with a remote computing device, various embodiments may enable three approaches for interactions between the aerial robotic vehicle and the remote computing device.

In combined centralized and decentralized approach, the remote computing device may make a centralized decision to trigger the decentralized algorithm on the aerial robotic vehicle in which the aerial robotic vehicle compares signal strength or signal quality between the two or more antennas in a search for the stronger antenna. When so directed, the aerial robotic vehicle processor may perform the antenna comparison to determine the best antenna to use based on the antenna signal quality.

In a centralized approach, the remote computing device may make only the centralized decision making to switch the antennal based on location, height, velocity, etc., and the aerial robotic vehicle processor will follow the decision/command of the remote computing device and not trigger any antenna selection algorithms.

In a decentralized only approach, the aerial robotic vehicle processor always triggers the decentralized algorithm to search for the stronger antenna or higher signal quality. In some embodiments, the aerial robotic vehicle processor may trigger the antenna comparison to determine the best antenna to use based on the antenna signal quality based upon altitude, location, velocity, etc. as described.

Figure 8:
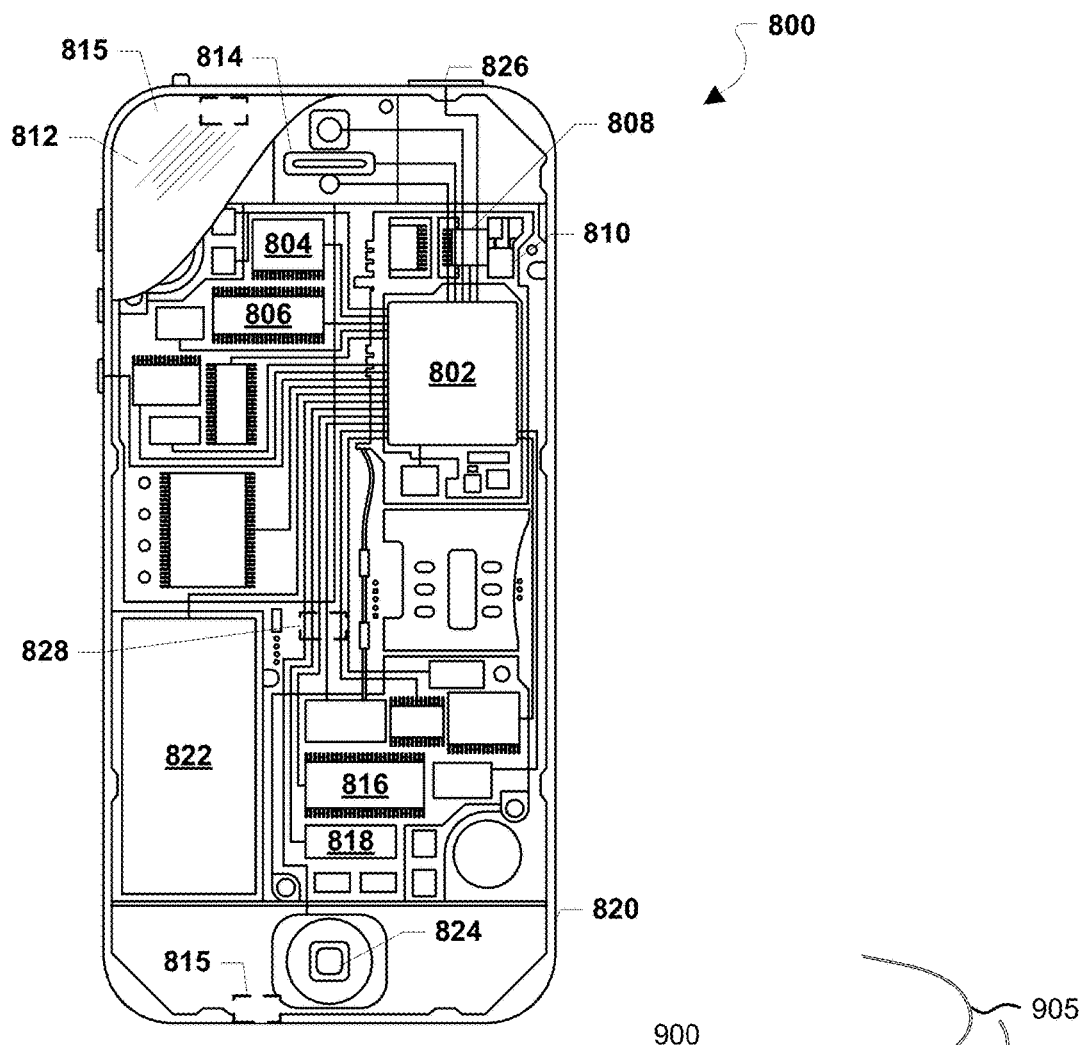
FIG. 8 is a component diagram of a wireless communication device suitable for use with various embodiments.
Figure 9:
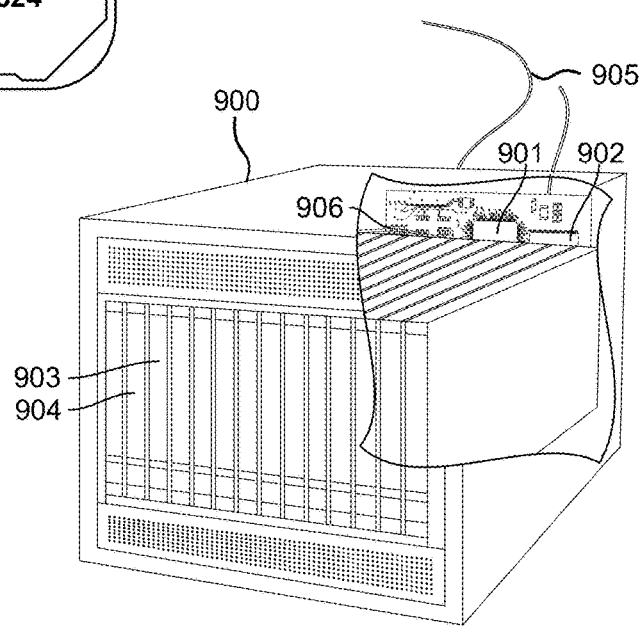
FIG. 9 is a component diagram of an example server suitable for use with the various embodiments.

As described, the processor determining whether to switch from using the first antenna to using the second antenna for active communications of the aerial robotic vehicle may be in a separate computing device that is in communication with the aerial robotic vehicle. In such embodiments, communications with the aerial robotic vehicle may be implemented using any of a variety of wireless communication devices (e.g., smartphones, tablets, smartwatches, etc.) an example of which is illustrated in FIG. 8. With reference to FIGS. 1-8, a wireless communication device 800 may include a processor 802 coupled with the various systems of the wireless communication device 800 for communication with and control thereof. For example, the processor 802 may be coupled to a touch screen controller 804, radio communication elements, speakers and microphones, and an internal memory 806. The processor 802 may be one or more multi-core integrated circuits designated for general or specific processing tasks. The internal memory 806 may be volatile or non-volatile memory, and may also be secure and/or encrypted memory, or unsecure and/or unencrypted memory, or any combination thereof. In another embodiment (not shown), the wireless communication device 800 may also be coupled to an external memory, such as an external hard drive.

The touch screen controller 804 and the processor 802 may also be coupled to a touch screen panel 812, such as a resistive-sensing touch screen, capacitive-sensing touch screen, infrared sensing touch screen, etc. Additionally, the display of the wireless communication device 800 need not have touch screen capability. The wireless communication device 800 may have one or more radio signal transceivers 808 (e.g., Peanut, Bluetooth, Bluetooth LE, ZigBee, Wi-Fi®, radio frequency (RF) radio, etc.) and antennae, the wireless communication device antenna 810, for sending and receiving communications, coupled to each other and/or to the processor 802. The radio signal transceivers 808 and the wireless communication device antenna 810 may be used with the above-mentioned circuitry to implement the various wireless transmission protocol stacks and interfaces. The wireless communication device 800 may include a cellular network wireless modem chip 816 coupled to the processor that enables communication via a cellular network.

The wireless communication device 800 may include a peripheral device connection interface 818 coupled to the processor 802. The peripheral device connection interface 818 may be singularly configured to accept one type of connection, or may be configured to accept various types of physical and communication connections, common or proprietary, such as USB, FireWire, Thunderbolt, or PCIe. The peripheral device connection interface 818 may also be coupled to a similarly configured peripheral device connection port (not shown).

In various embodiments, the wireless communication device 800 may include one or more microphones 815. For example, the wireless communication device may have microphones 815 that are conventional for receiving voice or other audio frequency energy from a user during a call. The wireless communication device 800 may also include speakers 814 for providing audio outputs. The wireless communication device 800 may also include a housing 820, constructed of a plastic, metal, or a combination of materials, for containing all or some of the components. The wireless communication device 800 may include a power source 822 coupled to the processor 802, such as a disposable or rechargeable battery. The rechargeable battery may also be coupled to the peripheral device connection port to receive a charging current from a source external to the wireless communication device 800. The wireless communication device 800 may also include a physical button 824 for receiving user inputs. The wireless communication device 800 may also include a power button 826 for turning the wireless communication device 800 on and off.

In various embodiments, the wireless communication device 800 may further include an accelerometer 828, which senses movement, vibration, and other aspects of the device through the ability to detect multi-directional values of and changes in acceleration. In the various embodiments, the accelerometer 828 may be used to determine the x, y, and z positions of the wireless communication device 800. Using the information from the accelerometer, a pointing direction of the wireless communication device 800 may be detected.

Various forms of computing devices may be used to communicate with a processor of an aerial robotic vehicle, including personal computers, wireless communication devices (e.g., smartphones, etc.), servers, laptop computers, etc., to implement the various embodiments including the embodiments described with reference to FIGS. 4-7. Such computing devices may typically include, at least, the components illustrated in FIG. 9, which illustrates an example server computing device. With reference to FIGS. 1-9, the server 900 may typically include a processor 901 coupled to volatile memory 902 and a large capacity nonvolatile memory, such as a disk drive 903. The server 900 may also include a floppy disc drive, compact disc (CD) or DVD disc drive 906 coupled to the processor 901. The server 900 may also include network access ports 904 (or interfaces) coupled to the processor 901 for establishing data connections with a network 905, such as the Internet and/or a local area network coupled to other system computers and servers. Similarly, the server 900 may include additional access ports, such as USB, Firewire, Thunderbolt, and the like for coupling to peripherals, external memory, or other devices.

In various embodiments, the aerial robotic vehicle (e.g., 101, 102, 103, or 301) may be configured to access the server 900 to periodically acquire position information for identifying a location of the aerial robotic vehicle or access a database correlating aerial robotic vehicle position to whether to use a particular one of the first and second antennas for active communications and/or communication links with the server 900. For example, the aerial robotic vehicle may receive periodic communications, from the server 900, indicating position information, instructions to compare antenna signal quality, and/or database updates. Alternatively or in addition, the aerial robotic vehicle may send periodic communications to the server 900 providing current location coordinates of the aerial robotic vehicle and/or indicating which antenna the aerial robotic vehicle is using to handle active communications.

The various embodiments enable the processor of the aerial robotic vehicle to manage communications of the aerial robotic vehicle. By managing the communications of the aerial robotic vehicle as described, the various embodiments improve the operation of the aerial robotic vehicle and communications therewith. The various embodiments may increase antenna gain, which may reduce the current needed for transmitting and/or receiving communication signals and thus conserve power. In addition, by switching from using one antenna to using another antenna, the various embodiments may improve received and/or transmitted signal quality for the aerial robotic vehicle.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 400, 500, 600 and/or 700 may be substituted for or combined with another.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with various embodiments may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method of managing communications of an aerial robotic vehicle having a first antenna and a second antenna, the method comprising:
    receiving, by a processor, position information identifying a location of the aerial robotic vehicle;
    determining, by the processor accessing a database, whether an active signal quality comparison should be performed based on the location of the aerial robotic vehicle, wherein the database correlates aerial robotic vehicle positions to whether the active signal quality comparison should be performed;
    comparing, by the processor, a first signal quality using the first antenna to a second signal quality using the second antenna in response to determining, based on the location of the aerial robotic vehicle, that the active signal quality comparison should be performed;
    determining, by the processor, whether to switch from using the first antenna to using the second antenna for active communications of the aerial robotic vehicle based on the comparison of the first signal quality and the second signal quality; and
    switching, by the processor, active communications from using the first antenna to using the second antenna in response to determining to switch from using the first antenna to using the second antenna for active communications of the aerial robotic vehicle.

2. The method of claim 1, wherein the position information includes an altitude of the aerial robotic vehicle and the location of the aerial robotic vehicle includes the altitude and geographic coordinates of the aerial robotic vehicle.

3. The method of claim 1, wherein the first antenna is configured to receive or transmit signals from above the aerial robotic vehicle better than the second antenna and the second antenna is configured to receive or transmit signals from below the aerial robotic vehicle better than the first antenna.

4. The method of claim 1, wherein the first antenna is disposed on an upper side of the aerial robotic vehicle and the second antenna is disposed on a lower side of the aerial robotic vehicle.

5. The method of claim 1, wherein switching active communications from using the first antenna to using the second antenna is performed in response to the second signal quality exceeding the first signal quality.

6. The method of claim 1, wherein the database correlates aerial robotic vehicle positions along at least one planned route of the aerial robotic vehicle to whether the active signal quality comparison should be performed.

7. The method of claim 1, wherein switching active communications from using the first antenna to using the second antenna includes switching active communications from using only the first antenna to using both the first and second antennas.

8. The method of claim 1, wherein the position information includes environmental information related to conditions near the aerial robotic vehicle.

9. The method of claim 1, wherein the position information identifies the location of the aerial robotic vehicle relative to one or more servicing base stations.

10. The method of claim 1, wherein the position information includes a speed or velocity of the aerial robotic vehicle.

11. The method of claim 1, wherein the processor is in the aerial robotic vehicle.

12. An aerial robotic vehicle, comprising:
a first antenna;
a second antenna separated from the first antenna; and
a processor coupled to the first antenna and the second antenna and configured with processor-executable instructions to:
receive position information identifying a location of the aerial robotic vehicle;
determine, from accessing a database, whether an active signal quality comparison should be performed based on the location of the aerial robotic vehicle, wherein the database correlates aerial robotic vehicle positions to whether the active signal quality comparison should be performed;
comparing a first signal quality using the first antenna to a second signal quality using the second antenna in response to determining, based on the location of the aerial robotic vehicle, that the active signal quality comparison should be performed;
determine whether to switch from using the first antenna to using the second antenna for active communications of the aerial robotic vehicle based on the comparison of the first signal quality and the second signal quality; and
switch active communications from using the first antenna to using the second antenna in response to determining to switch from using the first antenna to using the second antenna for active communications of the aerial robotic vehicle.

13. The aerial robotic vehicle of claim 12, wherein the processor is further configured with processor-executable instructions such that the position information includes an altitude of the aerial robotic vehicle and the location of the aerial robotic vehicle includes the altitude and geographic coordinates of the aerial robotic vehicle.

14. The aerial robotic vehicle of claim 12, wherein the processor is further configured with processor-executable instructions to switch active communications from using the first antenna to using both the first and second antennas.

15. The aerial robotic vehicle of claim 12, wherein the first antenna is configured to receive or transmit signals from above the aerial robotic vehicle better than the second antenna and the second antenna is configured to receive or transmit signals from below the aerial robotic vehicle better than the first antenna.

16. The aerial robotic vehicle of claim 12,
wherein the processor is further configured with processor-executable instructions to switch active communications from using the first antenna to using the second antenna in response to the second signal quality exceeding the first signal quality.

17. The aerial robotic vehicle of claim 12,
wherein the database correlates aerial robotic vehicle positions along at least one planned route of the aerial robotic vehicle to whether the active signal quality comparison should be performed.

18. The aerial robotic vehicle of claim 12, wherein the processor is further configured with processor-executable instructions such that the position information includes environmental information related to conditions near the aerial robotic vehicle.

19. The aerial robotic vehicle of claim 12, wherein the processor is further configured with processor-executable instructions such that the position information identifies the location of the aerial robotic vehicle relative to one or more servicing base stations.

20. The aerial robotic vehicle of claim 12, wherein the processor is further configured with processor-executable instructions such that the position information includes a speed or velocity of the aerial robotic vehicle.

21. An aerial robotic vehicle, comprising:
means for receiving position information identifying a location of the aerial robotic vehicle having a first antenna and a second antenna;
means for determining whether an active signal quality comparison should be performed based on the location of the aerial robotic vehicle, wherein the means for determining whether the active signal quality comparison should be performed correlates aerial robotic vehicle positions to whether the active signal quality comparison should be performed;
means for comparing a first signal quality using the first antenna to a second signal quality using the second antenna in response to determining, based on the location of the aerial robotic vehicle, that the active signal quality comparison should be performed;
means for determining whether to switch from using the first antenna to using the second antenna for active communications of the aerial robotic vehicle based on the comparison of the first signal quality and the second signal quality; and
means for switching active communications from using the first antenna to using the second antenna in response to determining to switch from using the first antenna to using the second antenna for active communications of the aerial robotic vehicle.

22. A processing device configured for use in an aerial robotic vehicle and configured to:
receive position information identifying a location of the aerial robotic vehicle having a first antenna and a second antenna;
determine, from accessing a database, whether an active signal quality comparison should be performed based on the location of the aerial robotic vehicle, wherein the database correlates aerial robotic vehicle positions to whether the active signal quality comparison should be performed;
comparing a first signal quality using the first antenna to a second signal quality using the second antenna in response to determining, based on the location of the aerial robotic vehicle, that the active signal quality comparison should be performed;
determine whether to switch from using the first antenna to using the second antenna for active communications of the aerial robotic vehicle based on the comparison of the first signal quality and the second signal quality; and
switch active communications from using the first antenna to using the second antenna in response to determining to switch from using the first antenna to using the second antenna for active communications of the aerial robotic vehicle.

23. The processing device of claim 22,
wherein the processing device is further configured to switch active communications from using the first antenna to using the second antenna in response to the second signal quality exceeding the first signal quality.

24. The processing device of claim 22, wherein the processing device is further configured with processor-executable instructions such that the position information includes an altitude of the aerial robotic vehicle and the location of the aerial robotic vehicle includes the altitude and geographic coordinates of the aerial robotic vehicle.

* * * * *